United States Patent [19]
Yaguchi et al.

[11] Patent Number: 5,735,013
[45] Date of Patent: Apr. 7, 1998

[54] APPARATUS FOR CLEANING OPTICAL FIBER

[75] Inventors: Shonosuke Yaguchi, Chiba; Mikio Yoshinuma, Yachiyo; Akinobu Kubota, Tokyo; Yoshitake Tomomura, Sagamihara, all of Japan

[73] Assignees: Fujikura Ltd.; Tokki Corporation, both of Tokyo, Japan

[21] Appl. No.: 631,208

[22] Filed: Apr. 12, 1996

[30] Foreign Application Priority Data

Apr. 13, 1995 [JP] Japan ............. 7-088491

[51] Int. Cl.⁶ ......................................... A47L 25/00
[52] U.S. Cl. ................. 15/210.1; 15/104.04; 15/220.4
[58] Field of Search ...................... 15/88, 100, 102, 15/104.03, 104.04, 210.1, 220.4, 256.5, 256.6, 308

[56] References Cited

U.S. PATENT DOCUMENTS

| | | | |
|---|---|---|---|
| 4,637,089 | 1/1987 | Schwarz | 15/210.1 |
| 5,056,180 | 10/1991 | Stanton | 15/220.4 |
| 5,220,703 | 6/1993 | Kanayama et al. | 15/210.1 |
| 5,253,412 | 10/1993 | Fukuoka et al. | 15/256.6 |

FOREIGN PATENT DOCUMENTS

| | | |
|---|---|---|
| 620884 | 5/1991 | Italy. |
| 7-287124 | 10/1995 | Japan. |

*Primary Examiner*—Terrence Till
*Attorney, Agent, or Firm*—Finnegan, Henderson, Farabow, Garrett & Dunner, L.L.P.

[57] ABSTRACT

The present application discloses an apparatus and a method of cleaning an optical fiber, which comprise a cleaning area where an optical fiber is placed between a first tape-shaped cleaning member and a second tape-shaped cleaning member; a first passing line, which is arranged in the cleaning area through which the first tape-shaped cleaning member passes; and a second passing line, which is arranged in the cleaning area and faces the first passing line, through which the second tape-shaped cleaning member passes.

7 Claims, 4 Drawing Sheets

APPARATUS FOR CLEANING OPTICAL FIBER

FIELD OF THE INVENTION

The present invention relates to an apparatus and a method for cleaning an optical fiber in a connecting process for connecting optical fibers by a connector, especially for a cleaning process for an optical fiber in order to remove silicone resin from the surface of a bare optical fiber.

BACKGROUND ART

It is necessary to clean bare optical fibers in which a resin coating has been removed by a hot stripper, in order to connect the bare optical fiber with another optical fiber. In this cleaning process, an operator holds a piece of cotton which, has been soaked in a cleaning liquid, and inserts a bare optical fiber into the piece of cotton and draws the bare optical fiber therethrough. Because the cleaning effect of a single pass varies depends on the steadiness of the operator, it is not certain how many cleaning passes are sufficient to clean the bare optical fiber. The bare optical fiber would be damaged and the strength of the bare optical fiber is reduced by excess cleaning. It is, however, necessary to sufficiently clean optical fibers in order to satisfactory connect the optical fibers and also to avoid any connection problems.

In order to sufficiently clean optical fibers, a pincette-like apparatus has been developed which holds a pair of cleaning cloths between which an optical fiber is to be cleaned. This apparatus cleans optical fibers using the pair of cleaning cloths soaked with a cleaning liquid via a micro tube. The pair of cleaning cloths performs cleaning, unless the cleaning cloths are contaminated; therefore, the operator should replace the contaminated cloths with new cleaning cloths. Because the cleaning performance of the contaminated cloths is less than the cleaning performance of the new cleaning cloths, the condition of the surface of cleaned optical fibers varies depending on the cleaning performance of the cleaning cloths.

Because the cleaning effect of a single pass varies depending on the level of contamination of the cleaning cloths, it is not certain how many passes are sufficient to clean a bare optical fiber. The bare optical fiber would be damaged and the strength of the bare optical fiber would be reduced by excess cleaning. Therefore, the above cleaning apparatus cannot sufficiently overcome the problems associated with cotton.

SUMMARY OF THE INVENTION

The present invention was made in light of the above-mentioned problems. It is an object of the present invention to sufficiently clean a surface of an optical fiber to a uniform condition using a process which is reliable and is easily accomplished by an operator.

In order to accomplish the above object, the present application discloses a method comprising: a step of drawing a tape-shaped cleaning member from a dispenser in which the tape-shaped cleaning member is stored; and a step of wiping an optical fiber using the tape-shaped cleaning member. The method also discloses a step of facing a surface of a first piece of the cleaning member which is drawn from the dispenser to a surface of a second piece of the cleaning member; a step of putting a part of the optical fiber between the first piece of the cleaning member and the second piece of the cleaning member; and a step of wiping the part of the optical fiber by the first piece of the cleaning member and the second piece of the cleaning member. The cleaning member of the above method is rolled in the dispenser and is drawn in series from the dispenser. Further, the first piece of the cleaning member and the second piece of the cleaning member are aligned in series.

It is possible to wipe and clean the optical fiber using a fresh surface of the pieces of cleaning member. It is also possible to obtain a good quality of connection in which the probability of a loss of connection is minimized and the strength of the optical fiber is sufficient.

The present application also discloses an apparatus for cleaning optical fiber, comprising: a cleaning area where an optical fiber is placed between first tape-shaped cleaning member and a second tape-shaped cleaning member; a first passing line, which is arranged in the cleaning area, through which the first piece of the tape shaped cleaning member passes; and a second passing line, which is arranged in the cleaning area and faces the first passing line, through which the second piece of the tape-shaped cleaning member passes. Further, the first tape shaped cleaning piece and the second tape-shaped cleaning piece are continuously aligned in one tape shaped cleaning member in series and continuously pass between the first passing line and the second passing line. The first passing line is arranged in a body and the second passing line which faces the first passing line is arranged in a lever which is pivoted with the body. The cleaning member is rolled in a bobbin which is contained in the body and is braked by friction between the bobbin and the inner surface of the body. The above cleaning apparatus further comprises: a first pinch roller and a second pinch roller between which the cleaning member is pinched; and a driving means which drives at least one of the two pinch rollers and is driven by the lever which moves relative to the body. The above driving means comprises a ratchet mechanism which transmits the rocking movement of the lever to one of the two pinch rollers so as to rotate one of the two pinch rollers.

It is possible to easily wipe and clean the optical fiber by drawing the optical fiber which is pinched between the first piece and the second piece of the tape shaped cleaning member; therefore, it is also possible to obtain a good quality connection in which the possibility of a loss of connection is minimized and the strength of the optical fiber is sufficient. Because the cleaning apparatus consists of the body, which contains the rolled tape shaped cleaning member, and the lever which is pivoted with the body, an operator transports the cleaning apparatus with ease can and clean an optical fiber by a simple procedure, that is, holding the cleaning apparatus in one hand, pushing down the lever so as to clamp the optical fiber between the two pieces of the cleaning member, and drawing the clamped optical fiber therethrough. Further, it is possible to continuously draw the tape-shaped cleaning member through the first passing line and the second passing line. The cleaning member is drawn through the passing lines by the feeding mechanism which is driven by the clamping action in which an operator pushes down the lever; therefore, new pieces of the tape-shaped cleaning member are automatically supplied to the cleaning area. An action of the lever 5 is simply transmitted to the ratchet mechanism via the transmitting mechanism. The tape-shaped cleaning member is rolled in the bobbin, which is contained in the body, and is urged toward the inner surface of the body in order to generate friction; therefore, it is possible to prevent excess rotation of the bobbin, and it is also possible to draw the cleaning member at a consistant tension through the passing lines.

DETAILED DESCRIPTION OF THE PREFERRED EMBODIMENT

Figure 1:
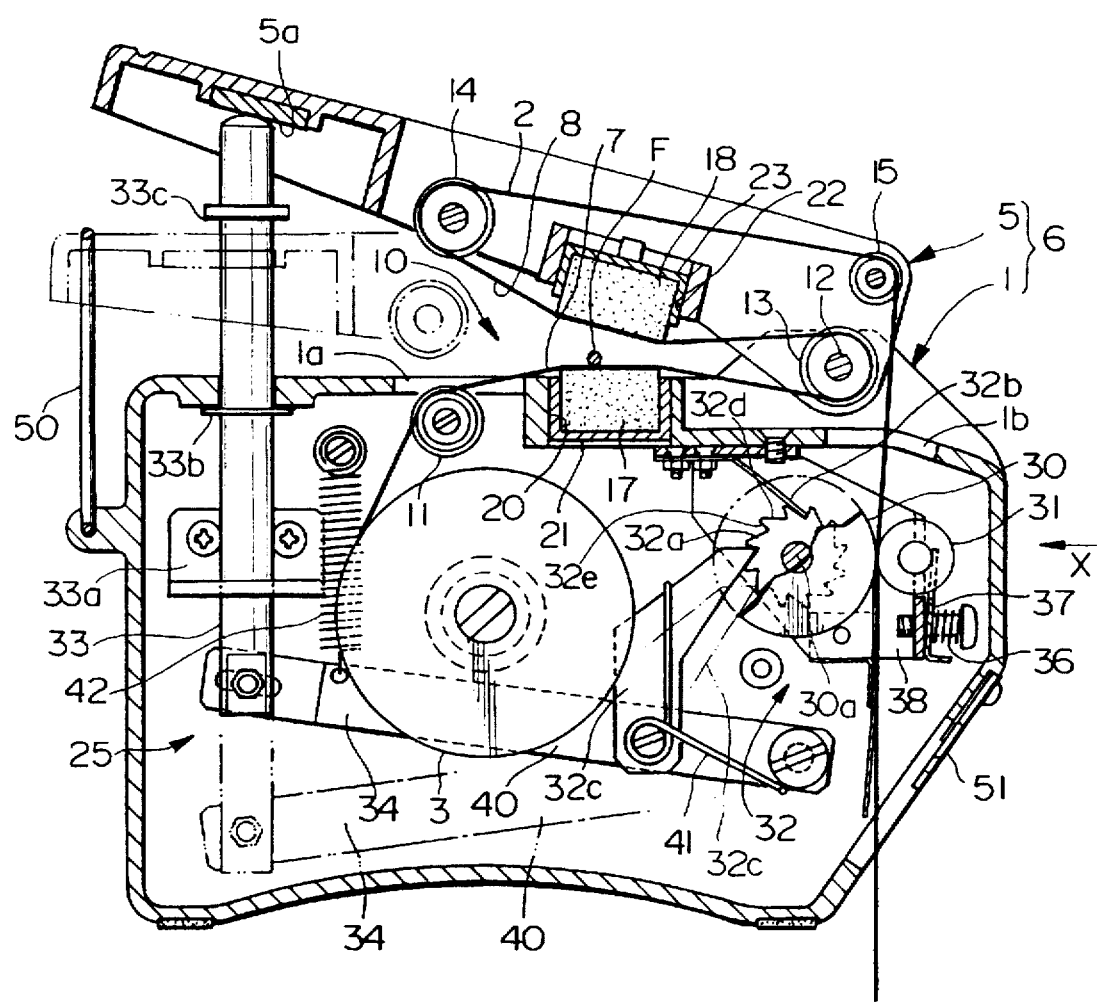
FIG. 1 is a sectional view of the apparatus of the preferred embodiment.
Figure 2:
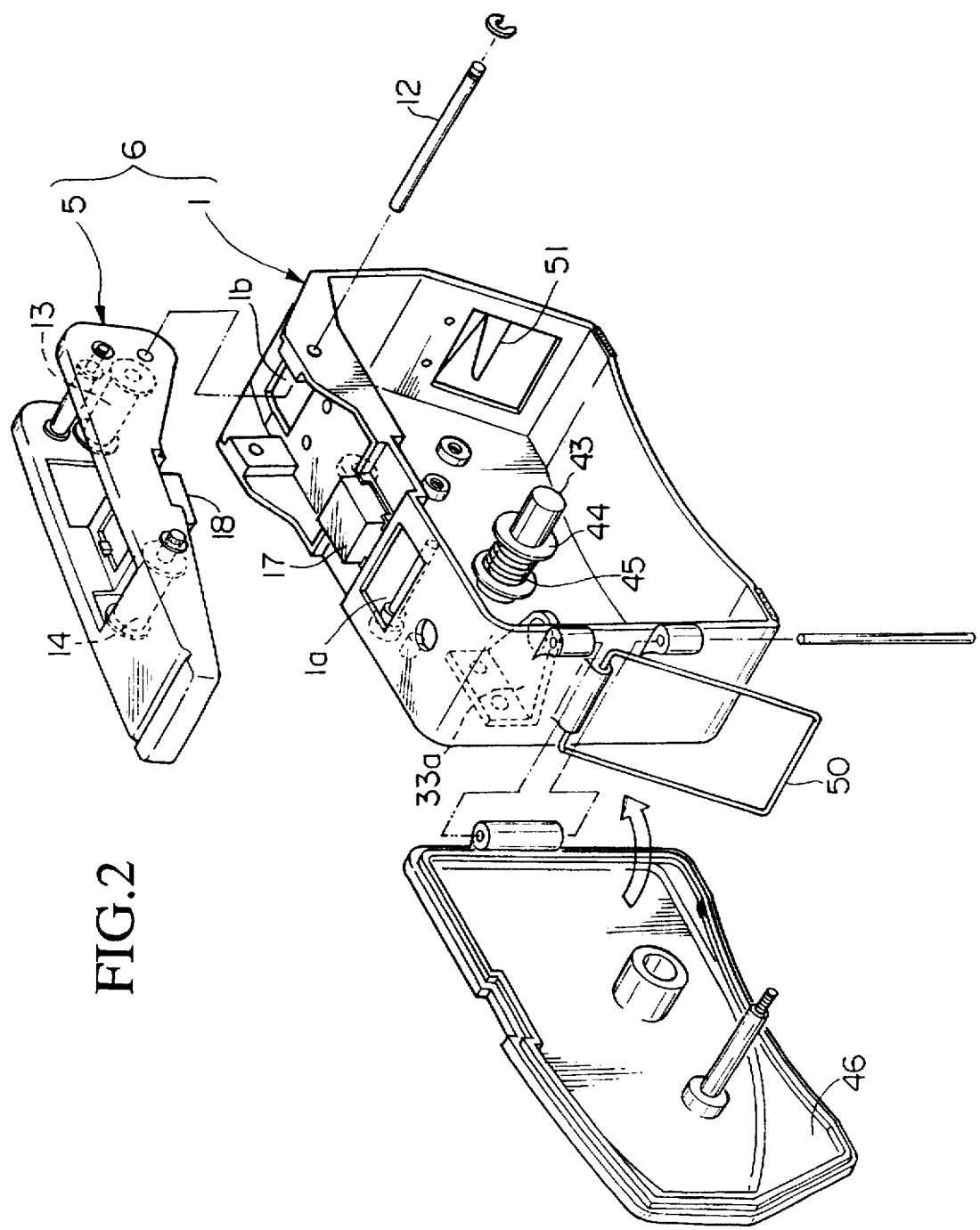
FIG. 2 is a exploded angled view of the body of the preferred embodiment.
Figure 3:
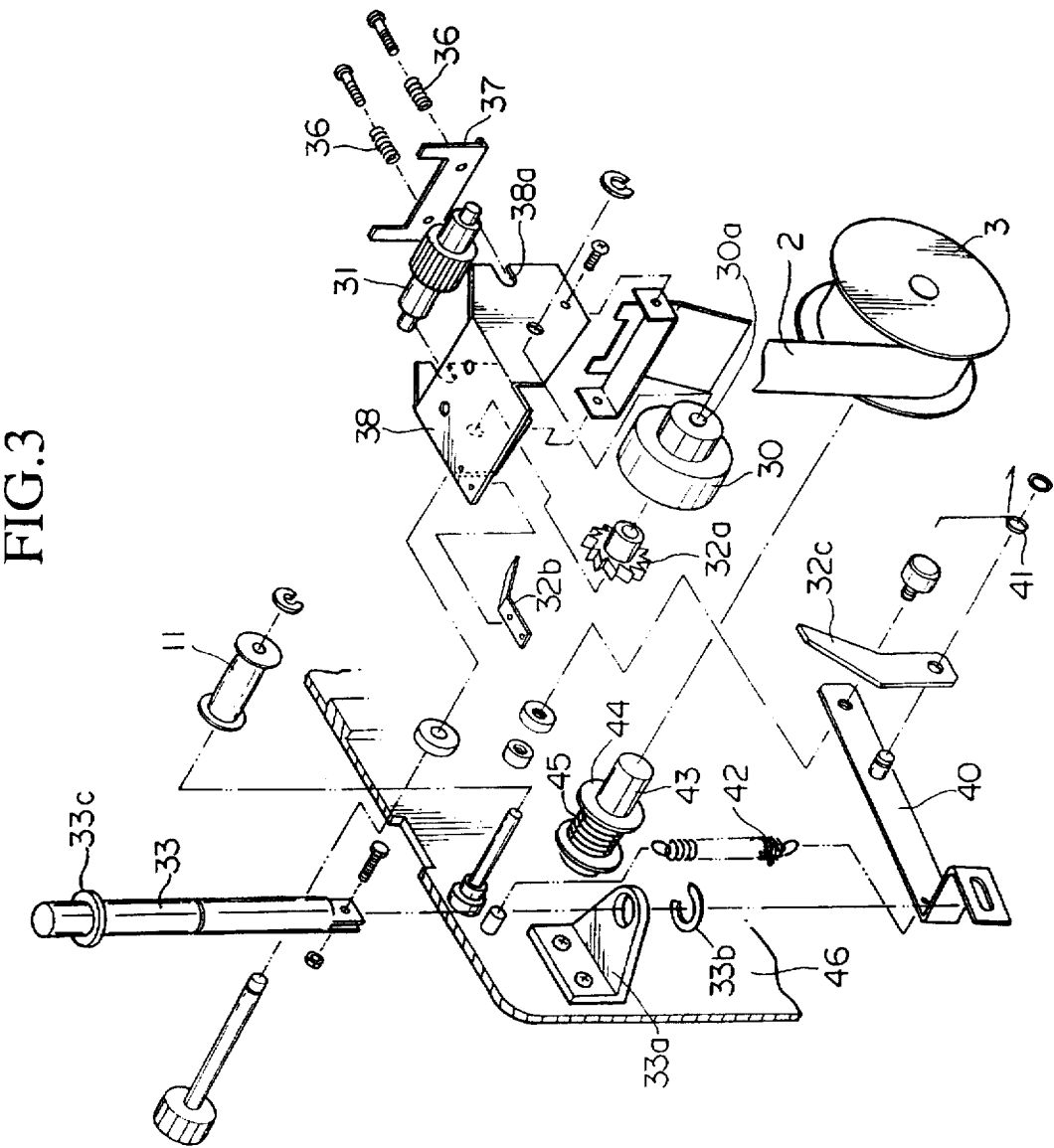
FIG. 3 is a exploded angled view of the ratchet mechanism of the preferred embodiment.

FIGS. 1 to 4 show a preferred embodiment of the present invention. FIG. 1 is a sectional view of a cleaning apparatus an for optical fiber. FIGS. 2 and 3 are angled views of the cleaning apparatus for optical fibers and show the construction inside the cleaning apparatus an for optical fiber.

Reference numeral 1 illustrates a body which may be made of molded plastic and in which a tape-shaped cleaning member 2 which is rolled on a bobbin 3, is contained. One end of a lever 5 is pivoted with the upper end of the body 1 by a pin 12. The lever 5 can rotate around the pin 12 so as to be brought toward or pulled away relative to the body 1. A clamping part 6 which clamps an optical fiber F to be cleaned is provided by the body 1 and the lever 5.

A passing line 7 is provided on an upper face of the body 1. A passing line 8 is provided on an under face of the lever 5. A cleaning area 10 in which the bare optical fiber F is cleaned is formed by a piece of the tape shaped cleaning member 2 on the passing line 7 and by another piece of the tape shaped cleaning member 2 on the passing line 8. A roller 11 which is arranged in the vicinity of an opening 1a of the body i and a roller 13 which is rotatably supported by the pin 12 are provided in order to guide the tape shaped cleaning member 2 supplied from the opening 1a to the passing line 7. The roller 13 also guides the tape shaped cleaning member 2 between the roller 13 and a roller 14 which is arranged in the middle part of the lever 5 in the longitudinal direction. A roller 15 is arranged in an upper part the roller 12 in order to guide the cleaning piece of the cleaning member 2 from the roller 14 into an opening 1b in the downward direction.

A flexible member 17, such as textile felt, is arranged in order to support the cleaning member 2 between the rollers 11 and 13 inside of the passing line 7 of the cleaning member 2 in the upper part of the body 1. A flexible member 18, such as textile felt, is also arranged in order to support the cleaning member between the rollers 13 and 14 inside of the passing line 8 of the cleaning member 2 at the under surface of the lever 5. The flexible member 17 is arranged in a holder 21 which is arranged in a concavity 20 which is provided in the middle of the upper face of the body 1. The flexible member 18 is arranged in a holder 23 which is arranged in a concavity 22 in the middle of the lower face of the lever 5.

A feeding mechanism 25, which is driven by the lever 5 which is operated upward and downward relative to the body 1, is provided so as to feed the cleaning member 2 through the passing lines 7 and 8.

The feeding mechanism 25 consists of a pair of pinch rollers 30 and 31 which pinch the leading part of the cleaning member 2 which is inserted into the body 1 through the opening 1b via the cleaning part 10, a ratchet mechanism 32 which drives the pair of pinch rollers 30 and 31, a rod 33 which is vertically and slidably supported in the body 1, an upper part of which projects upward and touches the under surface of the lever 5, and a transmitting mechanism 34 which transmits the movement of the rod 33 to the ratchet mechanism 32.

Grooves for avoiding slipping are formed on the surface of the pinch roller 31. A spring 36 urges a positioning plate 37 which positions the pinch roller 31 so as to touch the pinch roller 30 which is driven intermittently. The pair of pinch rollers 30 and 31 are rotatably supported by a supporting member 38. As shown in FIG. 3, the pinch roller 31 is supported in a recess 38a which is shaped like a flat oval, a major axis of which is directed in the urging direction of the spring 36 in order to slide in the recess 38a.

The ratchet mechanism 32 comprises a ratchet wheel 32a which is arranged coaxially with the pinch roller 30 and is integrated with the pinch roller 30, a claw 32b which is arranged inside of an upper part of the body 1 and engages with the ratchet wheel 32a to prevent rotation in a counterclockwise direction, and ratchet member 32c which engages the ratchet wheel 32a in order to drive the ratchet wheel 32a in a clockwise direction. A bottom end of the ratchet member 32c is pivoted with a link arm 40 and is urged in a clockwise direction in FIG. 1 by a coil spring 41.

The rod 33 passes thorough a hole 1c in the body 1. A middle part of the rod 33 is supported by bearing member 33a so that it may slide vertically, and an upper end of the rod 33 projects out of an upper face of the body 1 so as to be pushed down by a pushing part 5a on the under face of the lever 5. A bottom end of the rod 33 is pivoted with one end of the link arm 40, which is urged in a clockwise direction by the coil spring 42, so as to be urged upward. A stopper 33b is arranged in order to define an upper end of a stroke of the rod 33 by touching an under surface of the upper plate of the body 1. A stopper 33c is also arranged in order to define a lower end of the stroke of the rod 33 by touching an upper surface of the upper plate of the body 1. Another end of the link arm 40 is pivoted with the body 1 so as to allow a rocking motion around the pivot. The link arm 40 acts as a transmitting mechanism 34 which transmits an action of the rod 33 to the ratchet mechanism 32.

The bobbin 33 in which the tape-shaped cleaning member 2 is rolled is supported by a shaft 43 which is inserted in the bobbin 33. The shaft 43 also supports a ring 44 which is urged by a coil spring 45 in a axial direction in order to urge the bobbin 33 toward an inside surface of a cover 46 which comprises a part of the body 1 and covers the side face of the body 1.

The tape shaped cleaning member 2 is a rolled cloth which is made of ultra fine fibers such as "TORAYSEE" (Trade name of TORAY INDUSTRIES LTD.).

Figure 4:
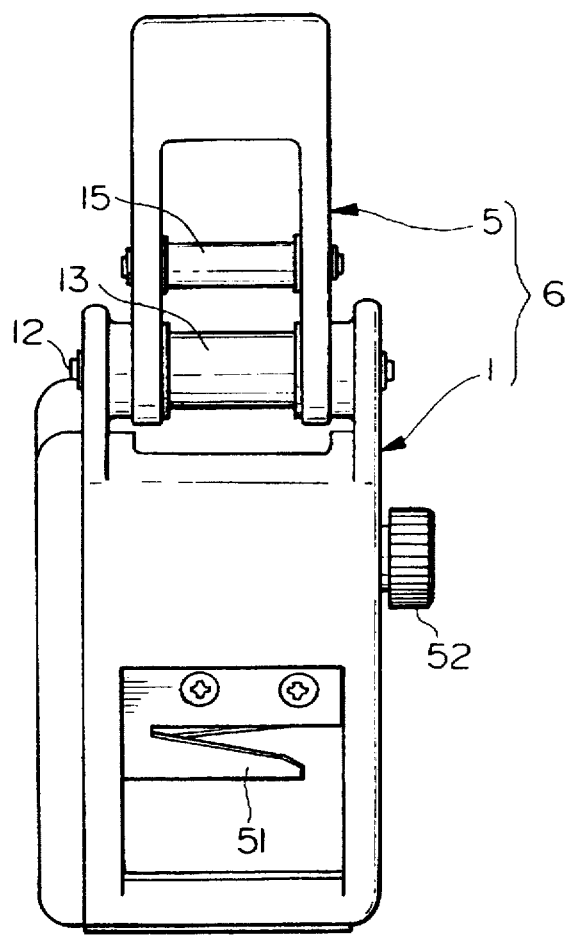
FIG. 4 is a view taken along the arrow IV of FIG. 1.

The reference numeral 50 in FIG. 2 indicates a frame which locks the lever 5 in a closed position. Reference numeral 51 in FIG. 2 indicates a blade which cuts an end part of the cleaning member 2. Reference numeral 52 in FIG. 4 is a knob which is fixed to the end of the shaft 30a of the roller 30 which projects out of the side face of the body 1 in order to drive the roller 30 and the shaft 30a.

The above-explained apparatus for cleaning an optical fiber performs cleaning by the following processes.

i. An operator puts the bobbin 3, in which the tape shaped cleaning member 2 is rolled, into the body 1. The operator draws a leading end of the cleaning member 2 into the first and second pinch rollers 30 and 31 via the rollers 11, 12, 13, and 14, which comprise a passing line, and also via the opening lb of the body 1. The operator rotates the knob 52 which is connected with the pinch roller 30 in order to draw the leading end of the cleaning member 2. Because the passing line of the cleaning member 2 thus arranged is turned by the roller 13, it is possible for the operator to wipe the optical fiber F between the pair of cleaning areas 10 which are formed at two locations of the single cleaning member 2.

ii. The operator supplies a cleaning liquid such as ethanol or methanol to the flexible members 17 and 18 in order to soak the flexible members 17 and 18.

iii. The operator places the bare optical fiber F to be cleaned by the cleaning member 2 on the flexible member 17.

iv. The operator pushes the lever 5 in order to push the rod 33 until the stopper 33c touches the upper surface of the body 1. It is possible to drive the rod 33 by pushing the lever 5 while the body 1 is provided on a flat plate. It is also possible to drive the rod 33 by pushing the lever 5 by an operator's thumb to the body 1 which is held in the hand of the operator. While the rod 33 thus moves, the link arm 40 moves downward as shown by the dotted line in FIG. 1. Together with the above movement of the link arm 40, the ratchet member 32c moves downward and slides on a slope 32d of the ratchet wheel 32a so as not to engage the ratchet wheel 32a. While the lever 5 is thus pushed, the optical fiber F is pinched between the cleaning member 2 of the first passing line 7 and the cleaning member 2 of the second passing line 8.

v. It is possible to wipe the optical fiber F by drawing the optical fiber F which was put between the cleaning members 2, in which the cleaning liquid was soaked, one or more times. Therefore, contaminants such as silicone resin on the surface of the optical fiber F are removed. Because the cleaning members 2 are supported by the flexible members 17 and 18, the optical fiber F is stably pressed between the cleaning members 2 with a constant pressure and the cleaning performance is also uniform. It is possible to control the pressure during the cleaning of the optical fiber F by changing the thickness of the flexible members 17 and 18 so as to avoid insufficient cleaning of the optical fiber F and also to prevent damage to the optical fiber F.

vi. After the above cleaning process of the bare optical fiber, the operator ceases application of pushing force on the lever 5. Then the coil spring 42 elastically shrinks and pulls up the link arm 40 together with the rod 33 so as to push the under face of the lever 5 upward. During the above movement of the link arm 40, the ratchet member 32c returns from a non-engaged position (shown by the dotted line in FIG. 1) in a recess 32e, to an engaging position (shown by the solid line in FIG. 1), and pushes the ratchet wheel 32a so as to rotate in the clockwise direction through a predeterminate angle together with the pinch roller 30. The pinch rollers 30 and 31 pull the leading end of the cleaning member 2 so as to draw a predeterminate length of the new cleaning member 2 from the bobbin 3. Then the face of the flexible member 17 is covered with the newly supplied cleaning member 2 and the face of the flexible member 18 is covered with the cleaning member 2 which was once used for cleaning on the flexible member 17.

The ratchet member 32c cannot engage with the ratchet wheel 32a until the lever 5 is pulled down to a position where the stopper 33c of the lever 5 touches the upper surface of the body 1; therefore, the ratchet mechanism 32 does not act and the pinch roller 30 does not rotate until the lever 5 is sufficiently driven.

The cleaning member 2 which passed the flexible member 18 after a cleaning process is guided into the blade 51 in the body 1 via the rollers 14 and 15 and then into the opening 1b. A part of the cleaning member 2 which is pulled out of the body 1 would be cut off from a remaining part of the cleaning member 2 by the blade 51.

The bobbin 3 is urged to the inside face of the cover 46 by the ring 44 which is urged by the coil spring 45 so as to generate friction between the bobbin 3 and the cover 46, and also so as to restrict the rotation of the bobbin 5. The ratchet wheel 32a is engaged with the claw 32b so as not to rotate in a counterclockwise direction, as shown in FIG. 1. Therefore, the cleaning member 2 of a pass line between the bobbin 3 and the pinch rollers 30 and 31 is drawn at a predeterminate constant tension.

In the above-explained apparatus, the optical fiber F lies between the first and the second pieces of the cleaning member 2 and is wiped by drawing the optical fiber F therethrough. It is possible to wipe and clean the optical fiber F by a fresh surface of the cleaning member 2. Therefore, it is possible to easily obtain optical fibers F having uniform surface conditions. It is also possible to obtain a connection of good quality in which the possibility of a loss of a connection is minimized and the strength of the optical fiber is sufficient.

Because the first piece and the second piece of the cleaning member 2 are supported by the first flexible member 17 and the second flexible member 18, the optical fiber F is clamped by a suitable pressure. It is therefore possible to prevent inadequate cleaning caused by an insufficient pressure of clamping and is also possible to ensure prevention of damage to an optical fiber caused by excess cramping pressure.

Because the first and the second flexible members 17 and 18 are arranged in the concavities 20 and 22, it is possible to contain a liquid to be soaked into the two flexible members 17 and 18 and also possible to supply the cleaning liquid into the two flexible members 17 and 18 for a long time. Because the two flexible members 17 and 18 are held in the concavities 20 and 22, it is possible to protect the two flexible members 17 and 18 from shearing force caused by the optical fiber F which is clamped between the two flexible members 17 and 18 during the cleaning process.

The cleaning apparatus consists of the body 1, which contains the rolled tape-shaped cleaning member 2, and the lever 5 which is pivoted with the body 1. Therefore, an operator can transport the cleaning apparatus with ease and clean an optical fiber by a simple process, that is, holding the cleaning apparatus by a single hand, pushing down the lever 5 so as to clamp the optical fiber F between the two pieces of the cleaning member 2, and drawing the clamped optical fiber.

Because the cleaning member 2 is serially drawn through the first passing line 7 on the upper face of the body 1 and the second passing line 8 under the under face of the lever 5, it is possible to clamp the optical fiber by a single line of the cleaning member 2. It is also possible to minimize handling tools.

The cleaning member 2 is drawn through the passing lines 7 and 8 by the feeding mechanism 25 which is driven by the clamping action in which an operator pushes down the lever 5; therefore, new pieces of the cleaning member 2 are automatically supplied to the cleaning area 10.

With the feeding mechanism 25, the action of the rod 33 which is arranged in the body 1 and is operated by the lever 5 is simply transmitted to the ratchet mechanism 32 via the transmitting mechanism 34.

The tape shaped cleaning member 2 is rolled on the bobbin 3 which is contained in the body 1 and is urged toward the inner surface of the cover 46 of the body 1 or another inner surface of the body 1 in order to generate friction between the side face of the bobbin 3 and the inner surfaces of the body 1. Therefore, it is possible to prevent excess rotation of the bobbin 3, and it is also possible to draw the cleaning member 2 by a stabilized tension through the passing lines 7 and 8.

Because the cleaning member 2 consists of a fabric made of ultra fine fibers, it is possible to wipe off particulates and materials such as oils on the surface of the bare optical fiber F.

A feature of the present invention is a process of cleaning by wiping the bare optical fiber by a tape-shaped cleaning member. Various kinds of apparatus which provide the tape-shaped cleaning member are available. It is possible to vary a specific construction of the apparatus. The present invention is not only suitable for the cleaning of bare optical fibers as in the preferred embodiment but is also suitable for cleaning optical fibers which have a coating layer. There is therefore no limitations of the objects to be cleaned.

It is possible to replace the rolled cleaning member 2 of the embodiment by an accordioned folded cleaning member.

It is possible to replace the lever 5 of the above embodiment by a body in which another coiled cleaning member is contained similar to the body 1, so as to respectively supply the tape shaped cleaning members to the first passing line and the second passing line.

In the above embodiment, the rotation of the lever 5 is transmitted to the ratchet mechanism 32 by the rod 33. It is also possible to drive the ratchet mechanism 32 by a gear transmission which rotates together with the shaft 12 which is driven by the lever 5.

In the above embodiment, one surface of the tape shaped cleaning member 2 which faces upward in the passing line 7 is turned by the roller 13 and then faces downward in the passing line 8. Therefore, the optical fiber F is cleaned by a same surface of the cleaning member 2. It is desirable to twist the tape shaped cleaning member 2 180 degrees between the passing lines 7 and 8 so that the surface of the tape shaped cleaning member 2 which has faced upward in the passing line 7 still faces upward in the passing line 8, and the other surface of the tape shaped cleaning member 2 which has faced downward in the passing line 7 faces downward in the passing line 8. With the tape shaped cleaning member 2 thus twisted, it is possible to wipe the optical fiber F using two surfaces, each of which are not contaminated, of the single tape shaped cleaning member 2.

It is also possible to provide an additional bobbin in order to roll the cleaning member 2 which is continuously pulled out of the body 1.

What is claimed is:

1. An apparatus for cleaning an optical fiber, comprising:
    a cleaning area in which an optical fiber is placed between a first section of a cleaning member and a second section of said cleaning member;
    said cleaning area comprising:
        a first passing line through which said first section of said cleaning member passes; and
        a second passing line, facing said first passing line, through which said second section of said cleaning member passes, wherein
said first and second sections of said cleaning member are serially contained in said cleaning member and pass between said first passing line and said second passing line.

2. The apparatus for cleaning an optical fiber according to claim 1, further comprising:
    a body; and
    a lever hingedly connected to said body, wherein
        said first passing line is provided in said body and said second passing line is provided along said lever and opposing said first passing line.

3. The apparatus for cleaning an optical fiber according to claim 2 wherein:
    said cleaning member is rolled on an a bobbin and frictionally engages an inner surface of said body to restrict rotation of said bobbin.

4. The apparatus for cleaning an optical fiber according to claim 3 further comprising:
    a first pinch roller and a second pinch roller for guiding said cleaning member; and
    driving means, activated by said lever, for rotating at least one of said first and second pinch rollers.

5. The apparatus for cleaning an optical fiber according to claim 4, wherein:
    said driving means comprises a ratchet mechanism which transmits rocking movement from said lever to one of said first and second pinch rollers for rotating one of said first and second pinch rollers.

6. An apparatus for cleaning an optical fiber, the apparatus comprising:
    a body member;
    a single continuous cleaning member having first and second sections contained within the body member; and
    a first passing line through which said first section passes and a second passing line through which said second section passes, said first and second sections of said cleaning member opposing one another and contacting opposite sides of the optical fiber.

7. An apparatus for cleaning an optical fiber, the apparatus comprising:
    a body member having a bobbin with a single continuous cleaning member wound thereon and a first passing line through which a first section of the cleaning member passes; and
    a lever hingedly connected to said body member and having a second passing line through which a second section of the cleaning member passes, the second section of the cleaning member facing the first section of the cleaning member, wherein
        the optical fiber is placed between the first and second facing sections of the cleaning member.

* * * * *